United States Patent
Kurian

(10) Patent No.: US 11,496,569 B1
(45) Date of Patent: *Nov. 8, 2022

(54) INTERNET OF THINGS ("IOT") VERSATILE NODES

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/374,052

(22) Filed: Jul. 13, 2021

Related U.S. Application Data

(63) Continuation of application No. 16/386,591, filed on Apr. 17, 2019, now Pat. No. 11,095,512.

(51) Int. Cl.
  *H04L 67/12* (2022.01)
  *G16Y 40/35* (2020.01)

(52) U.S. Cl.
  CPC .............. *H04L 67/12* (2013.01); *G16Y 40/35* (2020.01)

(58) Field of Classification Search
  CPC ....... H04L 67/12; H04L 63/107; H04L 63/20; G16Y 40/35; G16Y 30/10; G06F 21/74; G06F 21/78; G06F 21/60
  See application file for complete search history.

(56) References Cited

U.S. PATENT DOCUMENTS

| | | | |
|---|---|---|---|
| 8,984,113 B2 | 3/2015 | Li et al. | |
| 9,071,657 B2 | 6/2015 | Li et al. | |
| 9,729,528 B2 | 8/2017 | Zakaria et al. | |
| 9,813,398 B2 | 11/2017 | Li | |
| 9,875,510 B1 | 1/2018 | Kasper | |
| 9,882,912 B2 | 1/2018 | Joo | |
| 9,942,328 B2 | 4/2018 | Holland et al. | |

(Continued)

OTHER PUBLICATIONS

Mark Hung, "Leading the IoT," https://www.gartner.com/imagesrv/books/iot/iotEbook_digital.pdf, Gartner, Inc., Retrieved on Feb. 8, 2019.

(Continued)

*Primary Examiner* — David R Lazaro
(74) *Attorney, Agent, or Firm* — Weiss & Arons LLP; Michael A. Springs, Esq.

(57) ABSTRACT

IoT devices are usually single-purpose devices with a set of instructions and parameters. This disclosure relates to a versatile framework that overcomes technical challenges for repurposing nodes operating in an IoT environment. Specifically, this disclosure describes security and functionality adaptations for versatile nodes ("vnodes") operating within an IoT environment. Vnodes may include segmented data storage locations that allow multiple set of instructions and parameters to be stored on the vnode. The multiple sets of instructions/parameters may allow a vnode to perform a wide range of activities in different IoT operating environments. For example, a vnode may attach to a car during a trip then attach itself to the garage door, then re-attach to the car in the morning. Data storage may be segmented and allow data sharing between segmented storage locations. Data storage may be segmented and not allow data sharing between storage locations and thereby increases data controls.

5 Claims, 5 Drawing Sheets

(56) References Cited

U.S. PATENT DOCUMENTS

| | | | |
|---|---|---|---|
| 10,009,410 B2 | 6/2018 | Huang et al. | |
| 10,015,293 B2 | 7/2018 | Seed et al. | |
| 10,057,173 B2 | 8/2018 | Seed et al. | |
| 10,129,299 B1 | 11/2018 | McClintock et al. | |
| 10,148,502 B2 | 12/2018 | Idnani et al. | |
| 10,154,108 B2 | 12/2018 | Kuo et al. | |
| 10,251,053 B1 | 4/2019 | Paczkowski | |
| 11,095,512 B2* | 8/2021 | Kurian | H04L 41/0893 |
| 2012/0233657 A1* | 9/2012 | Guevin | H04L 63/10 726/1 |
| 2016/0072768 A1 | 3/2016 | Ibsies | |
| 2016/0173495 A1 | 6/2016 | Joo | |
| 2016/0212174 A1 | 7/2016 | Raleigh | |
| 2016/0241439 A1 | 8/2016 | Idnani et al. | |
| 2016/0259937 A1 | 9/2016 | Ford et al. | |
| 2016/0260095 A1 | 9/2016 | Ford | |
| 2016/0337127 A1 | 11/2016 | Schultz et al. | |
| 2017/0126513 A1* | 5/2017 | Colle | H04L 43/0852 |
| 2018/0218150 A1* | 8/2018 | Angelino | G06F 21/70 |
| 2018/0253451 A1 | 9/2018 | Callan et al. | |
| 2018/0317212 A1 | 11/2018 | Kazmi et al. | |
| 2019/0034350 A1 | 1/2019 | Lemay et al. | |
| 2019/0172566 A1 | 6/2019 | Schulman et al. | |
| 2019/0289454 A1 | 9/2019 | Inoue | |
| 2019/0349190 A1 | 11/2019 | Smith et al. | |
| 2020/0076815 A1* | 3/2020 | Smith | H04W 12/08 |
| 2020/0336366 A1* | 10/2020 | Kurian | H04W 4/12 |

OTHER PUBLICATIONS

Conoscenti et al., "Peer to Peer for Privacy and Decentralized in the Internet of Things," 2017, IEEE, pp. 288-290. (Year: 2017).

"An Introduction to MEMS (Micro-Electromechanical Systems)," https://www.lboro.ac.uk/microsites/mechman/research/ipm-ktn/pdf/Technology_review/an-introdaction-to-mems.pdf, Prime Faraday Technology Watch, Jan. 2002.

* cited by examiner

US 11,496,569 B1

INTERNET OF THINGS ("IOT") VERSATILE NODES

CROSS REFERENCE TO RELATED APPLICATION

This application is a continuation of Ser. No. 16/386,591, filed on Apr. 17, 2019, and entitled INTERNET OF THINGS ("IOT") VERSATILE NODES, which is hereby incorporated by reference herein in its entirety.

FIELD OF TECHNOLOGY

This disclosure relates to a versatile framework that overcomes technical challenges for repurposing nodes on an Internet of Things ("IoT"). Specifically, this disclosure describes security and functionality adaptations for nodes connected to, and operating on, an IoT.

BACKGROUND

An IoT may be defined as a pervasive and ubiquitous network which enables monitoring and control of the physical environment by collecting, processing, and analyzing the data generated by nodes (e.g., sensors or other smart objects). Securing the Internet of Things: A Proposed Framework, Jazib Frahim, Carlos Pignataro, Jeff Apcar and Monique Morrow, Published by Cisco Security Research & Operations and available at: https://www.cisco.com/c/en/us/about/security-center/secure-iot-proposed-framework.html.

Examples of such nodes include refrigerators, lights, smartphones, smartwatches, computers, laptops, tablets, sinks, hot water heaters, coffee machines, ovens, vehicles, thermostats and any other suitable devices. The diverse nature and large volume of data collected by numerous interconnected nodes on an IoT potentially enables unique functionality and operational opportunities.

Interconnected nodes may gather data. Computing systems may process the gathered data and derive new knowledge or insights from the gathered data. The new knowledge may be leveraged to provide feedback to the nodes or instructions to other nodes. Such feedback may improve efficiency and intelligence of the nodes. Exemplary effects of improved efficiency and intelligence may be recognized by optimizing processes, improving understanding and targeting of customer needs, increasing automation and decreasing latency when providing products and/or services.

Typically, nodes on an IoT are positioned within a fixed operating environment. Nodes may be specially configured to operate in the fixed environment. However, such specialized placement and configurations may limit functionality of the node. Nodes may be moved to a new operating environment. For example, a user may move to a new operating environment and require data gathering or other services from the node within the new environment. Nodes positioned within the fixed environment may not be capable of joining a new IoT and communicating with nodes affiliated with the new IoT within the new operating environment. Furthermore, nodes that have operated in the prior operating environment may have accumulated sensitive data that, if a node moves to a new environment, may not be adequately secured.

It would be desirable provide versatile nodes ("vnodes") that are capable of changing their operating missions. Such versatility and security may be technically challenging to implement. On an IoT, each of the connected nodes may not have uniform computing capabilities, known network positions, known communication protocols or sufficient resources to provide security services. Furthermore, nodes may not have a reliable connection to a centrally computing system that may issue instructions to the node or secure information stored on the node.

To solve these technical challenges, it would be desirable to provide technical solutions that allow nodes to dynamically adapt to changing IoT environmental conditions. If would further be desirable to provide nodes that may integrate with each other and dynamically join, dynamically form or dynamically dissolve an IoT operating environment. It would also be desirable to provide a technical solution that allows for securing data gathered within an IoT operating environment that include non-uniform and interconnected nodes. It would further be desirable to provide nodes that, despite their adaptability, secure information gathered by those nodes in a prior operating environment.

Accordingly, it is desirable to provide vnodes that are capable of changing their operating missions. Vnodes may change their operating mission automatically or in response to specific instructions or stimuli. Vnodes may transition into new roles that enhance resiliency and functionality of an IoT.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
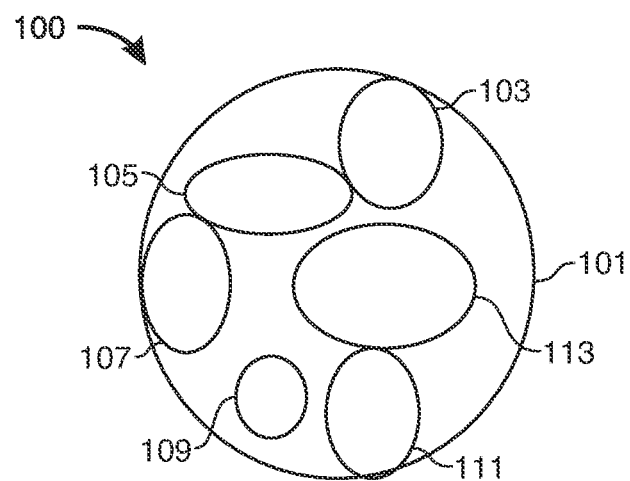
FIG. 1 shows an illustrative system architecture in accordance with principles of the disclosure.

An IoT network may include one or more nodes. Each node may include two or more nodes. A node may be a sensor. A sensor may include devices that detect changes in a physical or virtual operating environment. Such changes may define an attribute of the environment. For example sensors may measure attributes such as audio, rainfall, temperature, water levels or activity of other sensors. Sensors may measure electronic network traffic, electronic signals (e.g., input or output) or frequency of user logins within a predefined geographic area.

Sensors may be any suitable size. For example, sensors may be a few millimeters in size. Sensors may be deployed in a wide variety of locations. For example, sensors may be deployed in military battlefields, industrial plants, in orchards, in clothing, automobiles, smartphones, jewelry or refrigerators. Sensors may be relatively inexpensive and have low energy consumption. Sensors may "sense" two or more stimuli or environmental changes.

Sensors may implement two or more functions. For example, sensors may measure changes in their native (physical or virtual) environment, capture data corresponding to the measured changes and store/communicate the captured data. Sensors may be accessed by other sensors or other network nodes.

Nodes may store captured data. For example, nodes may store captured data in transitory and/or non-transitory computer readable media. Data captured by a node may be transmitted to another node. For example, sensors may broadcast captured data to two or more nodes.

Captured data may be transmitted using any suitable transmission method. For example, data captured by a sensor may be transmitted via a cellular network to a smartphone. Sensors may leverage a communication link provided by a smartphone to communicate captured data to other nodes.

As a result of the disparate nature of nodes, an operating environment may support a variety of communication protocols. Illustrative supported protocols may include Hyper-Text Transfer Protocol ("HTTP"), Simple Object Access Protocol ("SOAP"), REpresentational State Transfer ("REST") Constrained Application Protocol ("CoAP"), SensorML, Institute of Electrical and Electronic Engineers ("IEEE") 802.15.4 ("ZigBee") based protocols, IEEE 802.11 based protocols. For example, ZigBee is particularly useful for low-power transmission and requires approximately 20 to 60 milli-watts ("mW") of power to provide 1 mW transmission power over a range of 10 to 100 meters and a data transmission rate of 250 kilo-bits/second.

To further conserve energy, a node may communicate wirelessly for short periods of time. Utilizing this approach, one or more standard size single cell cylindrical dry battery batteries (e.g., AA size) may provide a node with requisite computing power and wireless communication for many months.

Communication protocols used by nodes (e.g., sensors or actuators) may not have, or may not be capable of having, security capabilities. A security layer or buffer may be implemented by nodes that receive or rely on data captured by unsecured sensors. Sensors or other nodes may be dynamically connected or disconnected from a group or architecture. A security layer or buffer may be modular and scalable meet node growth/contraction requirements.

A physical layer may link nodes within an operating environment. The physical layer may provide data ports and communication pathways to move data between multiple sub-networks and nodes. Such communication pathways may be wired or wireless. Exemplary wireless communication pathways may include Bluetooth, Wi-Fi, 3G, 4G, 5G and any other suitable wired or wireless broadband standards. Illustrative data ports of nodes may include hardware and/or software to receive and/or transmit data using any suitable communication pathway.

Each sensor may be a node and each sensor may be assigned a unique identifier. For example, sensors may be identified by one or more radio frequency identification ("RFID") tags. The RFID tag may be stimulated to transmit identity information about the sensor or any other information stored on the RFID tag. Sensors may be identified by an Internet Protocol ("IP") address.

Data captured by a sensor may be transmitted by the sensor and processed far from the location where the data was captured. For example, captured data may be transmitted from one node to another node until the captured data reaches a data repository.

Sensors may be positioned in, and capture data from, diverse operating environments. Operating environments may include geographic locations or virtual locations on electronic networks. Captured data may be transmitted to a location where information is needed for decisioning or consumption. Such a location may not be the same location where the data was captured or generated. Data synchronization protocols and caching techniques may be deployed across an IoT network to facilitate transmission of, or delivery to, a desired node.

For example, a location where data is captured may not have continuous, reliable network connectivity. Accordingly, captured data may be stored locally on the sensor until a network connection is available to transmit or broadcast the captured data to another node.

Sensors may be grouped. Sensors may be grouped based on physical proximity or based on the content (or expected content) of data captured by the sensor. Sensors may be grouped virtually.

Contextually, captured data may provide information not only about the native (physical or virtual) operating environment surrounding a sensor, but capturing of data from multiple sensors may provide data that signifies occurrence an event. Detecting the occurrence of the event may trigger sensors to take responsive action.

A node may be an actuator. For example, based on data captured by a sensor, an actuator may respond to a detected event. Based on the capture and analysis of multiple sources of data, an actuator may be instructed to take action without human intervention.

Actuators may respond to data transmitted or processed by other nodes. Actuators may include devices that modify the physical state of a physical entity. Actuators may include devices that modify a virtual state of information. Actuators may move (translate, rotate, etc.) physical objects or activate/deactivate functionalities of physical objects. For example, actuators may dim a light bulb, open a door, change a temperature setting, authorize access to an automated-teller-machine ("ATM") and/or any other suitable functionality. Actuators may verify identities, trigger electronic payments, extend credit or debit accounts.

Within an IoT environment, sensor nodes may perform the functions of input devices—they serve as "eyes" collecting information about their native environment. In contrast, actuator nodes may act as "hands" implementing decisions based on data captured by the sensor nodes. A single node may include the functions of sensors and actuators.

Actuators may include an application programming interface ("API") for communicating with other nodes. Actuators may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision-making and communication processes for actuators.

Generally, sensors, actuators and other nodes that form part of an IoT environment may include a processor circuit. The processor circuit may control overall operation of a node and its associated components. A processor circuit may include hardware, such as one or more integrated circuits that form a chipset. The hardware may include digital or analog logic circuitry configured to perform any suitable (e.g., logical) operation.

A node may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, electronic signatures of biometric features or any other suitable information or data structures. Components of a node may be linked by a system bus, wirelessly or by other suitable interconnections. Node components may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by a node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

A node may support establishing network connections to one or more remote nodes. Such remote nodes may be sensors, actuators or other computing devices. Nodes may be personal computers or servers. A node may communicate with other nodes using a data port. The data port may include a network interface or adapter. The communication circuit may include the modem. The data port may include a communication circuit. A node may include a modem, antenna or other communication circuitry for establishing communications over a network, such as the Internet. The communication circuit may include the network interface or adapter.

Via the data port and associated communication circuitry, a node may access network connections and communication pathways external to the node. Illustrative network connections may include a local area network ("LAN") and a wide area network ("WAN"), and may also include other networks. Illustrative communication pathways may include WiFi, wired connections, Bluetooth, cellular networks, satellite links, radio waves, fiber optic or any other suitable medium for carrying signals.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Nodes may include various other components, such as a display, battery, speaker, and antennas. Network nodes may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

A node may include a display constructed using organic light emitting diode ("OLED") technology. OLED technology may enhance functionality of a node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing nodes that consume less power for their basic functionality and allow any residual available power to provide enhanced security and functionality. Illustrative devices that may be constructed using OLED technology are disclosed in commonly assigned U.S. Pat. No. 9,665,818, which is hereby incorporated by reference herein in its entirety.

A node may be, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Nodes may utilize computer-executable instructions, such as program modules, executed by a processor. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. Nodes may rely on a network of remote servers hosted on the Internet to store, manage, and process data (e.g., "cloud computing").

Nodes may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that power one or more components of a node.

A node may capture data in real-time or at pre-defined intervals such as once a day. A node may capture data in response to a detected environmental status change.

A data analysis engine may filter data captured by one or more nodes. The data analysis engine may repackage or reformat captured data. Data conversion may include transformation of low level raw data (possibly from multiple sensors or groups of sensors) into meaningful information for a specific audience or for a specific analysis. The data analysis engine may be a node.

For example, captured data intended for human consumption or interaction may be converted into a human understandable format. Captured data intended for machine consumption may be converted into a format readable by a particular machine or node.

The data analysis engine may perform pattern recognition to identify correlations and trends in captured data. The data analysis engine may evaluate a cost of obtaining data. "Costs" may be monetary (e.g., labor costs or infrastructure costs), time-related or related to a level of intrusion needed to obtain desired data.

"Costs" may be bandwidth-related. For example, a communication pathway may be associated with a fixed bandwidth. A communication pathway may include nodes and network connectivity linking those nodes. The bandwidth may limit an amount of information or a rate of transmission over the communication pathway. As further example, a sensor may respond slowly to a request from another node if there is a large amount of informational traffic traveling on a communication pathway shared with other nodes. The large amount of informational traffic may not leave sufficient bandwidth for the transmitting node to timely communicate with the requesting node.

As a further example, a node may respond slowly if the node transmits a large amount of captured data. If transmitted all at once, the large amount of information transmitted by the node, together with other informational traffic traveling on a shared communication pathway, may be close to, or exceed bandwidth of the communication pathway. As a result, nodes on an IoT may be unable to transmit time-sensitive captured date in a timely manner.

Data travelling within an operating environment to/from nodes may be routed along multiple communication pathways until the transmitted information reaches a desired destination node (e.g., a data analysis engine). Each communication pathway may service a number of connected nodes and a respective volume of informational traffic.

It may be difficult to ascertain available bandwidth on a particular communication pathway. It may be difficult to ascertain which communication pathways are being utilized to transmit information between nodes. Nodes attempting to transmit information over a communication pathway may not be aware of a number of connected nodes, a volume of traffic on a particular communication pathway or a bandwidth capacity of a communication pathway.

Furthermore, a communication pathway may be controlled by a different entity from an entity responsible for operation of a particular node. The entity responsible for operation of the node may be unable to monitor a number of nodes that share a communication pathway, a bandwidth capacity of a communication pathway or a volume of traffic transmitted on a communication pathway. The data analysis engine may perform pattern recognition to estimate costs of obtaining data from a node on an IoT.

Data captured by nodes in an operating environment may be voluminous and complex (e.g., structured/unstructured and/or constantly changing). Traditional data processing application software may be inadequate to meaningfully process the data (e.g., "big data"). The data analysis engine may include software applications specially designed to process large volumes of data ("big data analytics").

An IoT operating environment may include one or more layers of software applications. Software applications may implement a variety of functions and provide varied services to nodes within the environment. Software applications running on a data analysis engine may submit requests to sensors for retrieval of specific data to achieve a functional goal provided by actuators. Software applications may control data captured by sensors or actions taken by actuators. Software applications may control a flow of information within an operating environment.

Software applications may be implemented on a node. A node may be an enterprise system or a "cloud" or "fog" of computing devices. On-device applications may be dependent on a specific hardware configuration. Such hardware requirements may preferably be minimal, such as an extension of the OS/firmware of the device. For example, illustrative software applications for sensors may include TinyOS, Linux, Contiki and RIOT.

Software applications may include middleware. Middleware may connect an operating system or database to other software applications. Middleware may configure and manage hardware such as nodes (e.g., to achieve a target functionality). Middleware may be responsible for aggregating data captured by nodes and passing captured data to a data repository and/or a data analysis engine.

Software applications may provide security services that mitigate threats to the integrity of data captured by nodes. Generally, nodes on a network may interact and cooperate using one or more interaction paradigms. Exemplary interaction paradigms include client-server and peer-to-peer interactions. However, an IoT may not include express or clearly defined relationships between sensors and the devices that access data captured by the sensors. Therefore, traditional approaches for managing trust, security naming, discovery, or other traditional network services may not be applicable or available.

Typically, a node is limited to performing functions within a defined operating environment. Typically, a node is limited to performing pre-determined functions. A node's pre-determined functions may be initially assigned, or programmed into the node, before the node in deployed in an operating environment.

A vnode may include one or more features of a node. A vnode may initially be deployed within a first IoT operating environment. The first operating environment may include any suitable nodes, number of nodes and grouping of nodes. As described herein, vnodes have an ability to change their initial mission or initial functionality. A vnode may adapt to a new operating environment. A vnode may be capable of implementing such changes by following a pre-programmed automated plan. A vnode may be capable of implementing such changes in response to instructions transmitted to the vnode. A vnode may be capable of implementing such changes in response to data gathered by itself or other nodes on an IoT.

A vnode may transition from its initially assigned role or mission into to a new role or mission. A vnode may transition by splitting its operational functionality to meet the needs of two or more networks or operating environments. A vnode may provide identical or different functionality to multiple operating environments. For example, a vnode sensor may provide identical data gathering functionality to two or more IoT environments. An ability of a vnode to operate within multiple operating environments may enhance resiliency and reliability of each IoT environment where the vnode operates.

Each IoT operating environment may be subject to different operational requirements. For example, a first environment may require sensed data to drive real time applications. Another environment may require sensed data to detect trends over relatively longer time periods. An operating environment may have specific reliability requirements. Such an operating environment may include devices that control navigation of an autonomous vehicle.

Each operating environment may be subject to different security requirements. For example, an operating environment may use sensed data to process financial transactions. Such an environment may have heighted security concerns.

A vnode may transition from one operating environment to another and maintain the operational, reliability or security requirements of the operating environment in which it currently operates. If a vnode leaves a secure operating environment, the vnode may be configured to protect any data gathered while operating on the secure environment before transitioning to a less secure environment. In some embodiments, a vnode may be configured to transition between operating environments and protect secure data while operating on a less secure environment.

For example, a vnode may be internally segmented. Internal segmentation may allow multiple sets of operating instructions and parameters to be stored in each segment. Each set of instructions and parameters may allow the vnode to perform (the same or different tasks) based on specific requirements of a particular network or operating environment.

Segmentation may include maintaining prior data or instructions associated with operation of the vnode in a first environment when the vnode transitions to a second environment. When the vnode is operating in the second environment, data/instructions for operating in the first environment may be hidden from other nodes associated with the second environment.

Data/instructions for the vnode to operate in the first environment may be hidden from vnode itself. For example, data/instructions may be hidden as long as the vnode is associated with the second environment. An association with the second environment may be defined by receiving or transmitting data to nodes associated with the second environment.

A procedure for hiding data/instructions may be triggered by detection of attributes associated with the second environment. For example, the vnode may detect it has changed location based on GPS coordinates. The vnode may detect a change in position based on a detected temperature or a change in any attribute monitored by the vnode in the first environment.

In some embodiments, in response to certain stimuli, the vnode may enter a defensive mode. A vnode may enter the defensive mode if it cannot ascertain whether it has been positioned in a new operating environment. The defensive mode may include hiding data/instructions for operating the vnode or other sensitive information until the vnode ascertains it is in a known operating environment. When in the defensive mode, the vnode may require a wired signal to return to normal operating conditions.

Segmentation may include storing operational data/instructions in a designated memory location within a vnode. The designated memory location may be defined based on a set of memory addresses. The designated memory location may be specialized hardware. Hiding data/instructions may include turning off a first data access port that provides access to the data/instructions. The vnode may utilize a second data access port for operations in the second environment.

The first data port may be configured to access a first subset of memory address locations. The second data port may be configured to access a second subset of memory address locations.

Memory address locations accessible to data ports of a vnode may be controlled by software running on the vnode. In some embodiments, a vnode may include a single data port and software may control access to memory address locations based on detected attributes of an operating environment. In some embodiments, the software may purge data stored in a memory location. Purging may cause the vnode to "forget" all data gathered in a first environment before operating in a second environment.

In some embodiments, access to memory address locations may be controlled mechanically. For example, a vnode may include a micro-electromechanical system ("MEMS") for moving an electronic switch. When the switch is closed, a data port of the vnode may access a first memory location. When the switch is open, the data port of the vnode may access a second memory location. The memory locations may be discrete memory banks or memory chipsets.

Maintaining data/instructions in the vnode while operating in the second environment may allow the vnode to transition back to operating in the first environment. Purging the data/instructions stored in the vnode before beginning operation in the second environment may enhance security of any such data/instructions acquired from the first environment.

Opening or closing of the switch or any other segmentation method may be triggered by stimuli detected by the vnode within an operating environment. A vnode may include self-learn data/logic that allows the vnode to adapt to new/emerging situations, targets and/or operating environments.

A vnode may include data/logic that controls transmission and/or receipt of information by the vnode. Such data/logic may include transmitting data tokens along with, or prior to, transmission of a data payload. The vnode may communicate with another node and, if the other node is able to provide an expected response to a transmitted data token, the vnode may initiate further communication with the other node. If the other node does not respond as expected, the vnode may terminate communication with the other node or enter a defensive mode. Expected responses in response to transmission of a data token may include answering a challenge question in real time or relaying certain artifacts.

Nodes may capture data in different formats. For example, nodes may use different data structures to package captured data. A vnode may be configured to utilize different communication protocols to transmit captured data or communicate with other nodes. Interoperability of a vnode may allow the vnode to move between operating environments and for data captured by a vnode to be substantially seamlessly captured and interpreted by other nodes within the vnodes current IoT operating environment. Interoperability of a vnode may allow the vnode to move between operating environments and for data captured by a vnode to be captured in a first operating environment and interpreted by nodes of a second operating environment.

In some embodiments, vnodes may receive operating instructions from one or more other nodes. For example, a central computer server may control a quantity and/or quantity of data captured by a vnode. A central computer server may instruct a vnode to move to a new operating environment, or provide instructions for how to move to a new operating environment.

For example, the vnode may receive instructions to move a specific position where it will be picked up and moved to a new location. Based on a weather pattern, the vnode may be instructed to move to a location where it is likely to be carried by wind, flowing water or a vehicle.

Apparatus and methods for a vnode are provided. The vnode may include a universal data port. The universal data port may be configured to capture information broadcast by another node. In some embodiments, the universal data port may be incapable of transmitting data from the vnode to another node.

The universal data port may be configured to capture attributes of a target node. The universal data port may be configured to capture attributes of two or more target nodes. A target node may be a member of an IoT sphere or operating environment.

The vnode may include a universal logical processing unit ("ULPU"). The ULPU may include the processor circuit. The ULPU may be configured to recognize attributes captured from a target node. Based on the recognized attributes, the ULPU may classify the target node as trusted or untrusted. A trusted target node may be a target node that the vnode has interacted with in the past. An untrusted node may be a target node that the vnode has not interacted with in the past. A target node may be classified as untrusted until the vnode interacts with the target node and/or the IoT environment associated with the target node for a threshold amount of time.

The vnode may include a first data port. The first data port may provide bi-directional communication with a target node. The vnode may communicate with the target node using a first data port when the target peripheral is trusted.

The vnode may include a second data port. The vnode may communicate with a target node using the second data port. The vnode may communicate with an untrusted target node using the second data port. The second data port may provide bi-directional communication with a target node.

When the target node is trusted, the ULPU may be configured to hand-off communication with the target node to a first sub-logical processing unit. The first sub-logical processing unit may allow secure electronic communication (e.g., with a trusted target node via the first data port) of data captured and/or processed by the vnode's ULPU.

Data captured and/or processed by the vnode's ULPU may be stored in one or more memory banks of the vnode. The first sub-logical processing unit may secure data captured by the ULPU from being disseminated to an untrusted node. The first sub-logical processing unit may provide a gatekeeping function that controls access to data captured and/or processed by the ULPU. For example, a first memory chipset may only be accessed via the first sub-logical processing unit. The first sub-logical processing unit may insulate the ULPU from having direct communication with a target node (trusted or untrusted).

The vnode may include a second sub-logical processing unit. The second sub-logical processing unit may be utilized for communicating with untrusted nodes. For example, when the target node is untrusted, the ULPU may be configured to purge data captured by a second sub-logical processing unit of the vnode. Purging data may include purging data stored in a second memory chipset accessible via the second sub-logical processing unit. Purging of the data may prevent an untrusted target node from accessing data previously captured by the vnode.

In some embodiments, the vnode may purge all data stored locally on the vnode (except for data needed to operate the vnode) before initiating bi-directional communication with an untrusted node. Such a purging may be included in a defensive mode.

After purging the data, the ULPU may hand-off communication with a target node to the second sub-logical processing unit. The second data port may be in electronic communication with the second sub-logical processing unit. The second data port may be electronically isolated from the first sub-logical processing unit, the first data port or other components associated therewith.

The ULPU may store information in a first memory bank. The first memory bank may be linked to the first data port. The ULPU may store information in a second memory bank. The second memory bank may be linked to the second data port. The first memory bank and the second memory bank may be logically divisions within a single memory bank.

The first memory bank may be a first physical memory bank. For example, the first memory bank may be a first chipset. The second memory bank may be a second physical memory bank. For example, the second memory bank may be a second chipset.

The second physical memory bank may be electronically isolated from the first physical memory bank. Electronically isolated, includes an inability to electronically transfer data from one location to the other. The vnode may include one or more moveable pins. The moveable pins may be configured to move into an engaged position and establish an electronic communication link between a memory bank and the ULPU. The moveable pins may be configured to move into a disengaged position and isolate the memory bank from the ULPU. The moveable pins may be constructed using MEMS technology.

In some embodiments, the vnode may not include a central ULPU. Instead, each sub-logical processing unit may be a self-contained unit. Each sub-logical processing unit may be capable of listening to communications broadcast by other nodes and deciding whether it will be the processing unit that processing communication with a target node.

The ULPU may be configured to capture and/or process data transmitted via the first and/or second data ports. The ULPU may maintain a central log of all data transmitted or received by the vnode. The ULPU may store captured and/or processed data (including the central log) in a secure memory location. The secure memory location may not be accessible via the first or second data ports. The secure memory location may not be accessible via the first or second sub-logical processing units.

In a first operating environment, the vnode may communicate with other nodes utilizing the first data port, the first sub-logical processing unit and first memory bank. The vnode may be transferred into a new operating environment. When deployed in the new operating environment, the vnode may communicate with other nodes utilizing the second data port, the second sub-logical processing unit and the second memory bank.

In some embodiments, within a single operating environment, the vnode may communicate with a first set of nodes utilizing the first data port, the first associated sub-logical processing unit and first memory bank. Within the same operating environment, the vnode may communicate with a second set of nodes utilizing the second data port, the second sub-logical processing unit and the second memory bank. An ability of the vnode to alternate between first and second data ports and associated components may allow the vnode to move between IoT operating environments and protect sensitive data gathered by the vnode when operating in a potentially unsecure or unknown operating environments or nodes.

The ULPU may include a machine learning algorithm. The algorithm may be configured to learn differences between a trusted node and an untrusted node. Illustrative machine learning algorithms may include Bayes predictors, neural networks or support vector machines. The machine learning algorithm may be configured to differentiate between trusted and untrusted nodes based on environmental attributes sensed by the vnode, data communicated to the vnode or based on instruction received from another node. Environmental attributes may be captured by the universal data port, the first data port and/or the second data port.

Illustrative environmental attributes may include physical attributes such as temperature, altitude and physical location. Illustrative environmental attributes may include electronic attributes such as remaining battery life, nature of requests (e.g., information requested) received from other nodes, number of requests for information or any suitable attribute.

Illustrative environmental attributes may include relative environmental attributes. Relative environmental conditions may include how far a vnode has physically moved over time or other changes in physical environmental attributes. Relative environmental attributes may include changes in electronic environmental attributes such as data connectivity, data transmission rates, number of requests for data captured by the vnode or time until a battery powered vnode needs to be connected to a power supply.

Apparatus for a vnode are provided. The vnode may include a universal data port configured to capture attributes of a target node. The vnode may not have had any prior interaction with the target node.

The vnode may include a first memory bank. The first memory bank may be in electronic communication with the universal data port. The vnode may include a second memory bank. The second memory bank may be in electronic communication with the universal data port.

The vnode may include a first set of moveable pins. The first set of moveable pins may be configured to move into an engaged position and establish an electronic communication link between the first memory bank and the universal data port. When the moveable pins are in the engaged position, the moveable pins may complete an electronic circuit linking the first memory bank and the universal data port.

The linking may allow data transfer between the first memory bank and the universal data port. Nodes connected to the universal data port may thereby access the first memory bank and ULPU. The universal data port may provide a bidirectional communication pathway linking the vnode and the target node.

The moveable pins may be configured to move into a retracted position thereby severing an electronic communication link between the first memory bank, the universal logical processing unit and/or the universal data port.

The moveable pins may be a MEMS system. MEMS is a process technology that may be used to create integrated devices or systems that combine mechanical and electrical components. MEMS devices may range in size from a few micrometers to millimeters.

The vnode may include a second set of moveable pins. The second set of moveable pins may have an engaged position and a retracted position. In the engaged position, the second set of moveable pins may provide an electronic communication link between the second memory bank and the universal data port. In the retracted position, the second set of moveable pins may sever the electronic communication link between the second memory bank and the universal data port.

The ULPU of the vnode may be configured to process attributes captured from a target node. Based on the captured attributes, the ULPU may classify the target node as trusted or untrusted. When the target node is classified as trusted, the ULPU may instruct the first set of moveable pins to move into the engaged position. When the target node is classified as trusted, the ULPU may instruct the second set of moveable pins to move into the retracted position. When the target node is classified as untrusted, the ULPU may instruct the second set of moveable pins to move into the engaged position. When the target node is classified as untrusted, the ULPU may instruct the first set of moveable pins to move into the retracted position.

The ULPU may determine that a vnode is in a hostile environment. The ULPU may identify a hostile environment based on monitoring behavior of other target nodes in the operating environment. Such behavior may include requests for information submitted to the vnode or other communications by the target nodes.

When the ULPU determines that the vnode is in the hostile environment, the ULPU may issue instructions that move the first set of moveable pins into the retracted position. Moving the first set of moveable pins into the retracted position may prevent other nodes in the environment from accessing information stored in the first memory bank via the universal data port. Moving the first set of moveable pins into the retracted position may secure data in the first memory bank.

In some embodiments, when the ULPU determines that the vnode is in a hostile environment, the ULPU may issue instructions that move the second set of moveable pins into the retracted position. The second memory bank may store information that is deemed less sensitive than the information stored in the first memory bank. Nevertheless, in the hostile environment, the vnode may enter a defensive mode and move the first and second set of moveable pins into their retracted positions and secure data in the first and second memory banks.

The ULPU may determine that the vnode is in a safe environment. A safe environment may be determined based on identifying nodes that the vnode has previously interacted with. A safe environment may be determined based on detecting security protocols deployed along the perimeter of an IoT sphere or operating environment.

In response to entering the safe environment, the vnode may move the first set of moveable pins into the engaged position. When the first set of moveable pins are in the engaged position, other nodes may access the data stored in the first memory bank via the universal data port. The vnode may move the second set of moveable pins into the engaged position. When the second set of moveable pins are in the engaged position, other nodes may access the data stored in the second memory bank via the universal data port.

In some embodiments, the first and second sets of moveable pins may be mechanically linked. For example, moving the first set of moveable pins into the engaged position may moves the second set of moveable pins into the retracted position. Moving the second set of moveable pins into the engaged position may move the first set of moveable pins into the retracted position.

Methods for operating a vnode are provided. Methods may include operating the vnode within an IoT operating environment. Methods may include operating the vnode on two or more IoT operating environments or networks.

Methods may include deploying the vnode in a first operating environment. The first environment may include a first group of nodes operating in the first environment. Methods may include configuring the vnode based on detected attributes of the first environment. Attributes of the first environment may be detected by the vnode. Attributes of the first environment may be detected by the any other node operating in the first environment.

Methods may include capturing data from the first environment. Methods may include storing the data captured from the first environment in a first memory location on the vnode. Methods may include sharing the data captured from the first environment and stored in the first memory location with the first group of nodes operating in the first environment.

Methods may include moving the vnode to a second operating environment. The vnode may be moved into the second operating environment by humans, natural forces (wind, water current) or by mechanical operation (travel affixed to a vehicle). Methods may include configuring the vnode based on attributes of the second environment. Attributes of the second environment may be detected by the vnode. Attributes of the second environment may be detected by the any other node operating in the second environment.

Methods may include capturing data from the second environment. Methods may include storing the data captured from the second environment in a second memory location. Methods may include sharing the captured data stored in the second memory location with a second group of nodes operating in the second environment.

The configuring of the vnode based on attributes of the second environment may include locking the first memory location from being accessed by members of the second group of nodes. The configuring of the vnode based on attributes of the second environment may include purging any data stored in the second memory location before capturing or transmitting data within the second environment.

Methods may include sharing captured data stored in the first memory location with the first group of nodes using a first data port. Methods may include sharing captured data stored in the second memory location with the second group of nodes using a second data port.

The configuring of the vnode based on the attributes on the first environment may include designating a first dedicated memory location within a memory bank for storage of the data captured from the first environment. The configuring of the vnode based on attributes of the second environment may include designating a second dedicated memory location within the memory bank for storage of the data captured from the second environment. Designating a memory location may include activating a set of memory locations dedicated to data associated with an operating environment.

The configuring of the vnode based on the attributes of the first environment may include forming an electronic link between a first dedicated memory location and a data port. The configuring of the vnode based on attributes of the second environment may include disengaging the electronic link between the first dedicated memory location and the data port. The configuring of the vnode based on attributes of the second environment may include forming an electronic link between a second dedicated memory location and the data port.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with another illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative vnode 100. Vnode 100 includes logic unit 105. Logic unit 105 may be a ULPU and/or a sub-logical processing unit. Logic unit 105 may include the processor circuit. Vnode 100 includes data port 107 for communicating with one or more target nodes. Data port 107 may access logic unit 105. Logic unit 105, when accessed via data port 107 may provide access to a specific set of computing resources. For example, logic unit 105 may utilize data port 107 for communicating with a target node having specific attributes. Such attributes may include an untrusted target node or a target node suspected of malicious behavior. Such a target node may be identified when the target node does not possess a recognized data token or does not provide an expected answer to a security challenge questions.

When connected to the target node via data port 107, logic unit 105 may be configured to limit computer services provided to the target node. Limits may include access a specific memory location, limit access to processing power provided by the vnode's processor circuit, limit data transmission using the vnode's communication circuit or take any suitable precaution to control computing resources of the vnode allocated to interaction with the target node. Illustrative limits may also include limits on a quantity of data processed/transmitted/received, time dedicated to processing data on behalf of the target node. Illustrative limits may include purging data stored in a memory location or otherwise limiting access of the target node to information gathered by vnode 100.

Vnode 100 includes data port 103 for communicating with external nodes. When connected to a target node via data port 103, logic unit 105 may allow the target node unrestricted access to computing resources of vnode 100. In some embodiments, when connected to the target node via data port 103, logic unit 105 may allow the target node access to a memory location not accessible via data port 107. Data stored in the memory location accessible via data port 105 may include sensitive data or historical data gathered by vnode 100.

Vnode 100 includes data port 111. Vnode 100 includes logic unit 113 in electronic communication with data port 111. Using data port 111, vnode 100 may connect with a specialized class of nodes. Such specialized nodes may include nodes that provide a specific function, are located in a specific geographic region or detect desired environmental attributes. Logic unit 113 may be specially configured to process communication and data received from the specialized class of nodes.

For example, logic unit 113 may include security protocols that execute when vnode 100 interacts with an Automated Teller Machine ("ATM"). Vnode 100 may connect to the ATM using data port 111 and logic unit 115 may encrypt all communication between vnode 100 and the ATM. Data stored and processed by logic unit 115 may be physically segregated from data stored and processed by logic unit 105. Logic unit 113 may be configured to self-purge any data received from the ATM (or other node) after completing an interaction with the ATM (or other node). Logic unit 113 may be configured to self-purge any data received from the ATM (or other node) after expiration of pre-determined time period.

Vnode 100 also includes internal listening logic unit 109. Internal listening logic unit 109 may log interactions between vnode 100 and other target nodes carried out via data ports 107, 105 and/or 111. In some embodiments, data logged by listening logic unit 109 may only be accessible via a wired connection to vnode 100.

Each of logic units 105, 109 and 115 may store a data token that authorizes communication with the respective logic unit. Each of logic units 105, 109 and 115 may be programmed with machine learning algorithms that are configured to adapt to new/emerging situations and/or communication with target nodes. Such machine learning algorithms may learn to classify target nodes and connect to those target nodes using a data port best suited for communication with those target nodes.

Figure 2:
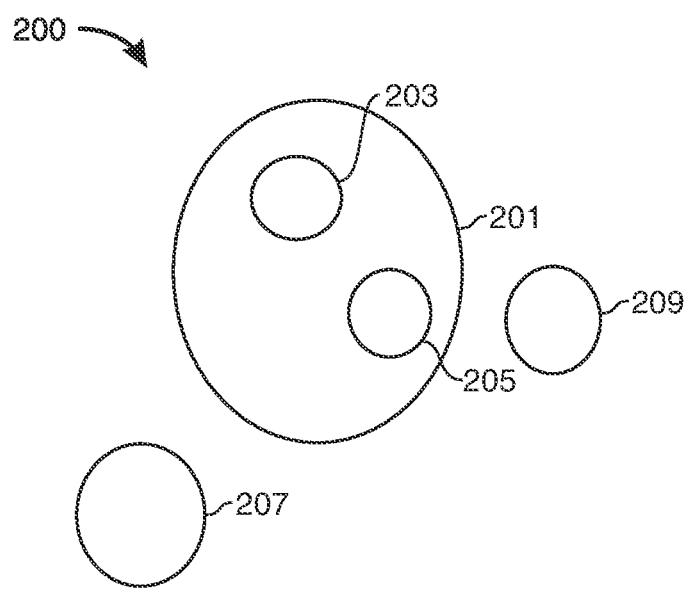
FIG. 2 shows an illustrative system architecture in accordance with principles of the disclosure.

FIG. 2 shows illustrative scenario 200. Scenario 200 shows nodes 203, 205, 209 and 207. Scenario 200 shows nodes 203 and 205 operating within IoT environment 201. Nodes 203 and 205 may be assigned fixed positions within IoT environment 201. Vnodes 207 and 209 may be "free-floating" vnodes configured to transition between different IoT environments.

Figure 3:
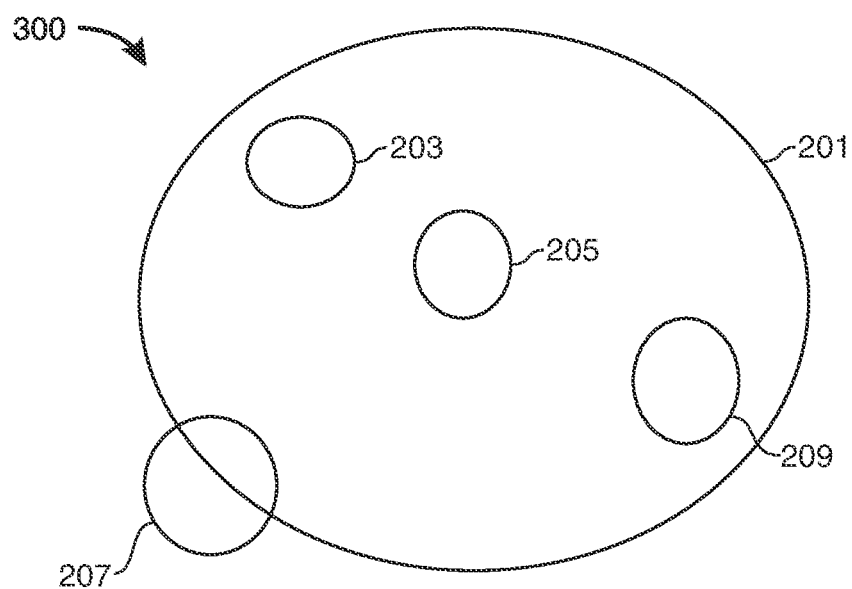
FIG. 3 shows an illustrative system architecture in accordance with principles of the disclosure.

FIG. 3 shows illustrative scenario 300. Scenario 300 shows that vnode 209 has moved into IoT operating environment 201. By moving into operating environment 201, vnode 209 may interact with other nodes in operating environment 201. Vnode 209 may share data gathered prior to joining IoT environment 201 with nodes 203 and 205. Vnode 209 may purge data gathered prior to joining IoT environment 201. Vnode 209 after joining IoT environment 201, vnode 209 may limit computing resources available to nodes 203 and 205.

Scenario 300 also shows that vnode 207 is being shared by operating environment 201 and an operating environment external to environment 201. Even after entering operating environment 201, vnode 209 may communicate with nodes outside operating environment 201. Vnode 207 may communicate with nodes within operating environment 201 using a different data port and associated logic unit (e.g., a sub-logic unit) than the data port and associated logic unit used to communicate with nodes outside operating environment 201. Vnode 207 may purge some or all of its data prior to joining operating environment 201.

Scenarios 200 and 300 (shown in FIGS. 2 and 3) may collectively, represent the following illustrative scenario. Operating environment 201, as shown in FIG. 2, may correspond to a status of an IoT network prior to a natural disaster. Nodes 203 and 205 may represent mobile devices of a financial institution's regular and established customers.

Such regular and established customers may utilize their mobile devices to access services provided by the financial institution from within operating environment 201. Such services may include access to an online banking portal and associated services, access to a network of ATMs and/or other financial services.

Nodes 207 and 209 may represent mobile devices of individuals that do not have an established relationship with the financial institution. Nodes 207 and 209 may not have access to financial services provided from within operating environment 201.

After and/or during a natural disaster, operating environment 201 may allow nodes 207 and 209 to join operating environment 201. Occurrence of the natural disaster may be detected by nodes within or outside of operating environment 201. Nodes 207 and 209 may be provided temporary access to the financial services available from within operating environment 201. Operating environment 201 may allow nodes 207 and 209 to access the financial services via specific data ports.

Operating environment 201 may allow nodes 207 and 209 to access the financial services. Nodes operating within environment may require that nodes 207 and 209 store data associated with accessed financial services in specific memory locations. By granting access to nodes 207 and 209, nodes within operating environment 201 may require that all communication with nodes 207 and 209 be encrypted. Nodes within operating environment 201 may require that all data stored on nodes 207 and 209 be encrypted.

FIG. 3 shows that node 209 may establish a relationship with the financial institution and retain full access to financial services provided within operating environment 201. FIG. 3 shows that node 207 may leave operating environment 201. FIG. 3 shows that node 207 may have established a level of trust with operating environment 201. Such trust may be established by virtue of node 207's prior interactions with operating environment 201. Such trust may be leveraged should node 207 attempt to reconnect with operating environment 201 at a later time. Such trust may allow node 207 to communication with operating environment after joining another operating environment.

Scenarios 200 and 300 (shown in FIGS. 2 and 3) may collectively, represent the following illustrative scenario. Operating environment 201, as shown in FIG. 2, may represent a new automobile. Nodes 203 and 205 may represent nodes embedded in the automobile.

Nodes 209 and 207 may represent mobile devices of drivers. FIG. 3 shows that the drivers may lease the new automobile and join their mobile devices to operating environment 201. Node 209 may represent a mobile device of a primary driver of the automobile. Node 207 may represent a mobile device of a secondary driver of the automobile. Node 209 may be provided access to more features of the automobile than node 207.

For example, node 209 may be allowed to unlock a secure storage area with the automobile, change audio settings, operate the automobile for an unlimited amount of time or activate a garage door opener. Node 209 may be allowed to permit a package delivery service to access the automobile and place a package into a secure storage area.

Node 207 may be provided limited access to features or nodes of the automobile. Node 207 may be an electronic key used by a parking attendant or valet. Node 207 may only be used to drive the automobile a limited distance or for a limited amount of time. Node 207 may be unable to changes settings within the automobile.

When the automobile is returned at the end of the lease rental period, node 209 may exit operating environment 201. In response to detecting that node 209 is exiting operating environment 209, nodes 203 and 205 may purge any information obtained from node 209. When the automobile is returned at the end of the lease rental period, node 209 may purge any information obtained from nodes 203 or 205. An exiting of node 209 from operating environment 201 may detected based on a date associated with expiration of the lease rental period of the automobile.

Figure 4:
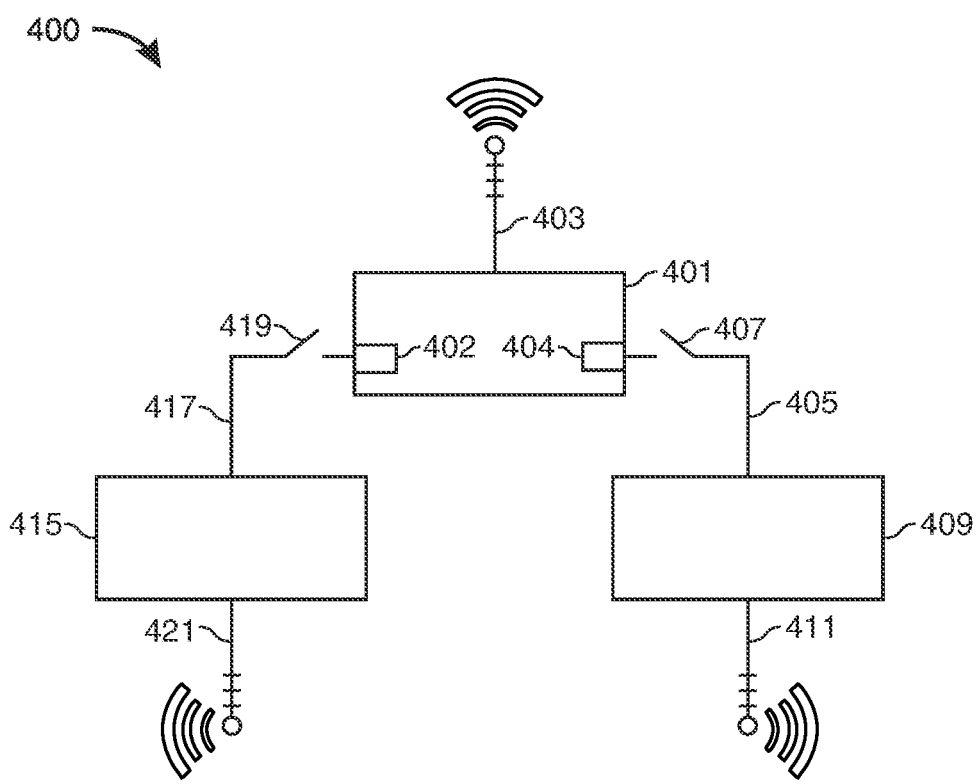
FIG. 4 shows illustrative apparatus in accordance with principles of the disclosure.

FIG. 4 shows illustrative components of vnode 400. Vnode 400 includes universal logical processing unit or ULPU 401. ULPU 401 is in electronic communication with universal data port 403. ULPU 401 may include a communication circuit. FIG. 4 shows universal data port 403 as being a wireless data port. In other embodiments, universal data port 403 may be a wired data port or may be capable of both wired and wireless communication.

Universal data port 403 may communicate with other nodes and capture attributes associated with those nodes. Captured attributes may be processed by ULPU 401. Based on the captured attributes, ULPU 401 may classify another node as trusted or untrusted.

Vnode 400 may communicate with a target node using first data port 421 when the target node is trusted. FIG. 4 shows first data port 421 as being a wireless data port. In other embodiments, first data port 421 may be a wired data port or may be capable of both wired and wireless communication.

Vnode 400 may communicate with a target node using second data port 411. Vnode 400 may utilize second data port 411 when a target node is untrusted. FIG. 4 shows second data port 411 as being a wireless data port. In other embodiments, second data port 411 may be a wired data port or may be capable of both wired and wireless communication.

ULPU 401 may be configured to hand-off communication with a target node to first sub-logical processing unit 415. First sub-logical processing unit 415 may allow electronic transfer, to the target node, via first data port 421, of data captured or processed by ULPU 401. ULPU 401 may be configured to hand-off communication with a target node to second sub-logical processing unit 409. Second sub-logical processing unit 415 may allow electronic transfer, to the target node, via second data port 411, of data captured or processed by ULPU 401.

ULPU 401 includes first memory bank 402. First memory bank 402 may be electronically linked to first sub-logical processing unit 415 and first data port 421. Second sub-logical processing unit 409 and second data port 411 may be isolated from and not have access to first memory bank 402.

ULPU 401 includes second memory bank 404. Second memory bank 404 may be electronically linked to second sub-logical processing unit 409 and second data port 411. First sub-logical processing unit 415 and first data port 421 may be isolated from and not have access to second memory bank 404.

First and second memory banks 402 and 404 may be logically discrete divisions of a single memory bank. First memory bank 402 may be a first physical memory bank. Second memory bank 404 may be a second physical memory bank that is electronically isolated from the first physical memory bank.

ULPU 401 may be configured to capture data transmitted via the first and second data ports 421 and 411. ULPU 401 may store data captured from first and second data ports 421 and 411 in a secure memory location and is not accessible via the first or second data ports 421 and 411. Universal logical processing unit 401 may store data captured from first and second data ports 421 and 411 in a secure memory location and is not accessible to first or second sub-logical processing units 415 and 409.

FIG. 4 also shows switches 419 and 407. Switches 419 and 407 may be controlled by ULPU 401. Switches 419 and 407 may be MEMS devices. Switches 419 and 407 may be controlled electronically and/or mechanically. Switches 419 and 407 may have an open/retracted position or a closed/engaged position. For example, when switch 419 is in a closed/retracted position, ULPU 401 may be accessible via first data port 421. When switch 419 is in an open/retracted position, ULPU 401 may not be accessible via first data port 421.

Switches 419 and 407 may be used to control and secure access to ULPU 401 and/or universal data port 403. In some embodiments, when vnode 400 enters a defensive mode, switches 419 and 407 may both be in the open/retracted position. Opening/retracted both of switches 419 and 407 may further secure data stored in ULPU 401 from being accessed via first or second sub-logical processing units 415 and 409 or first and second data ports 421 and 411.

Figure 5A:
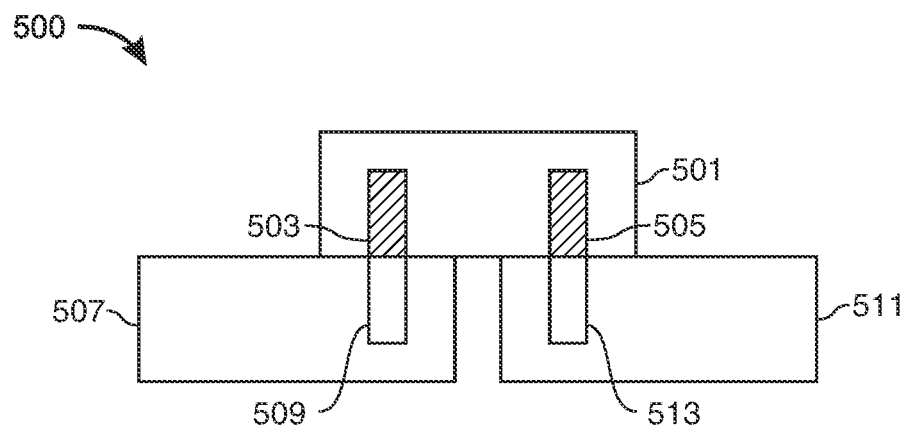
FIG. 5A shows illustrative apparatus in accordance with principles of the disclosure.

FIG. 5A shows illustrative vnode 500. Vnode 500 includes universal logical processing unit or ULPU 501. ULPU 501 may include a communication circuit. Vnode 500 includes first sub-logical processing unit 507. First sub-logical processing unit 507 may include a communication circuit. Vnode 500 includes second sub-logical processing unit 511. Second sub-logical processing unit 511 may include a communication circuit.

ULPU 501 controls first moveable pin 503. In some embodiments, ULPU 501 may control a first set of moveable pins. Vnode 500 includes female connector 509. FIG. 5A shows moveable pin 503 in a retracted or open position. When moveable pin 503 is in the retracted or open position, ULPU 501 is electronically isolated or segregated from first sub-logical processing unit 507.

When moveable pin 503 is in the retracted or open position, vnode 500 may utilize first sub-logical processing unit 507 to communicate or process communication with a target node. The target node may be untrusted or otherwise unknown. Communicating with the target node with moveable pin 503 in the open or retracted position may secure data stored in ULPU 501 until trust is established with the target node. If first sub-logical processing unit 507 cannot communicate or establish trust with universal logical processing unit 501, functionality of vnode 500 available to the target node may be limited.

Moveable pin 503 may be configured to be positioned in a closed or engaged position. In the closed/engaged position, moveable pin 503 may be configured to contact female connector 509 and establish an electronic connection linking ULPU 501 and first sub-logical processing unit 507. When the electronic connection links ULPU 501 and first sub-logical processing unit 507, first sub-logical processing unit 507 may access data or other functionality of ULPU 501. Moveable pin 503 may be engaged or disengaged from female connector 509 based on instructions provided by ULPU 501.

ULPU 501 controls second moveable pin 505. Second sub-logical processing unit 511 includes female connector 513. When moveable pin 505 is in a closed/engaged position, it contacts female connector 513, and an electronic connection is established linking ULPU 501 and second sub-logical processing unit 511. When the electronic connection links ULPU 501 and second sub-logical processing unit 511, second sub-logical processing unit 511 may access data or other functionality of ULPU 501. Moveable pin 505 may be engaged or disengaged from female connector 513 based on instructions provided by universal logical processing unit 501.

In some embodiments, moveable pins 503 and 505 may include a set of moveable pins. The set of moveable pins may be controlled by ULPU 501. ULPU 501 may control movement of individual members of the set of moveable pins. Controlling movement of individual members of the set of moveable pins may allow for tuning access to ULPU 501 based on one or more attributes of a target node or IoT operating environment. For example, engaging some pins of the set may provide access to some memory location of ULPU 501 and not others.

Figure 5B:
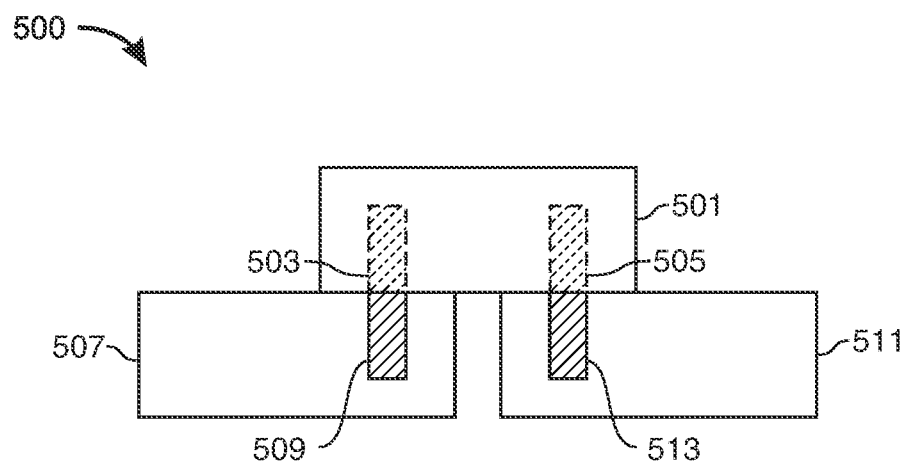
FIG. 5B shows illustrative apparatus in accordance with principles of the disclosure.

FIG. 5B shows moveable pins 503 and 505 is an engaged or closed position. In the closed/engaged position, moveable pins 503 and 505 contact female connectors 509 and 513, establishing an electronic communication path linking universal logical processing unit 501 to first and second sub-logical processing units 507 and 511.

Figure 6:
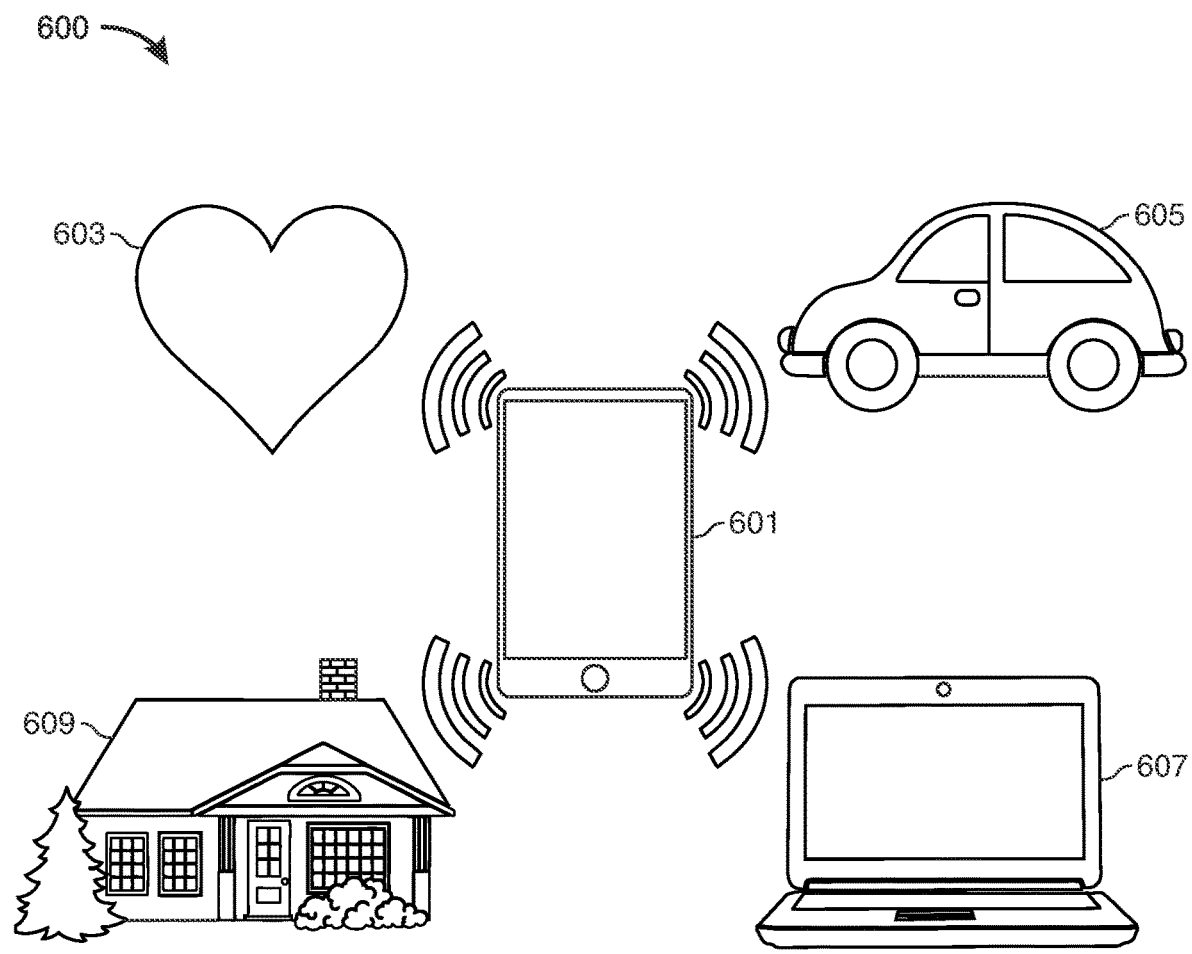
FIG. 6 shows an illustrative system architecture in accordance with principles of the disclosure.

FIG. 6 shows illustrative system architecture 600. Architecture 600 includes vnode 601. Vnode 601 may be a mobile device or any suitable node described herein. Architecture 600 shows that vnode 601 may establish communication with target nodes 603, 605, 607 and 609. Vnode 601 may execute a segmentation routine to determine resources of vnode 601 that may be allocated to one or more of target nodes 603, 605, 607 and 609.

For example, when vnode 601 communicates with target node 609, vnode 601 may apply a "home" segmentation routine. Target node 609 may represent a group of nodes that function within a home IoT operating environment. The home segmentation routine may allow target node 609 and vnode 601 to communicate and access their respective functionality and services. Vnode 601 may communicate instructions to target node 609 that adjust temperature, adjust lighting schedule set an alarm system or control appliances. Target node 609 may alert vnode 601 if a burglar, fire or smoke alarm has been triggered. Target node 609 may alert vnode 601 is someone is at the front door. When in the home segmentation routine, vnode 601 may be configured to unlock a door in response to an alert.

When vnode 601 communicates with target node 603, vnode 601 may apply a "health" segmentation routine. Target node 603 may be wearable devices that monitor vital signs or other biological data. Target node 609 may represent a group of nodes that gather health-based information within an IoT operating environment. Using the health segmentation routine, vnode 601 may receive data from target node 603 and may not transfer data stored on vnode 601 to target node 603.

When vnode 601 communicates with target node 605, vnode 601 may apply an "automobile" segmentation routine. Target node 605 may represent a group of nodes that function within an automobile IoT operating environment. Using the automobile segmentation routine, vnode 601 may limit communication with target node 605 to specific automobile-related functionality. Such specific functionality may be limited to communications regarding audio settings, phone contacts, speed or travel of automobile 605 or other automobile related functionality or attributes. Target node 605 may be prevented from accessing data stored on vnode 601 and associated with target nodes 603 or 607 or 609.

When vnode 601 communicates with target node 607, vnode 601 may apply a "work" segmentation routine. Target node 607 may represent a group of nodes that function within a work related IoT operating environment. Such specific functionality may be limited to communications regarding email settings, phone contacts, location services, or other work related functionality or attributes. Using the work segmentation routine, vnode 601 may limit communication with target node 607 to specific work-related functionality. Target node 607 may be prevented from accessing data stored on vnode 601 and associated with target nodes 603 or 607 or 609.

Figure 7:
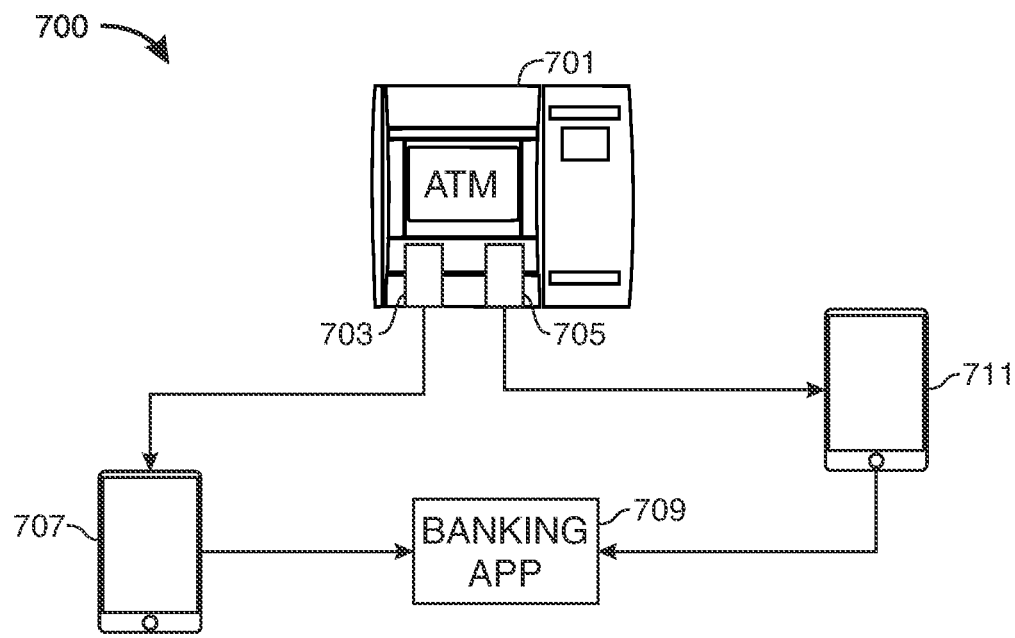
FIG. 7 shows illustrative apparatus in accordance with principles of the disclosure.

FIG. 7 shows illustrative apparatus 700. Apparatus 700 includes vnode 701 and target nodes 707 and 711.

Target node 707 may represent a mobile device of a regular and established customer of a financial institution. Using banking app 709 installed on target node 707, the established customer may access services provided by ATM 701. ATM 701 may be configured to recognize target node 707 as belonging to an established customer and allow target node 707 to access services via data port 703. Access via port 703 may provide target node 707 unrestricted access to services of ATM 701.

Target nodes 711 may represent a mobile device of an individual that does not have an established relationship with the financial institution. Target node 711 may operate banking app 709 and gain access to ATM 701 via data port 705. Access via data port 705 may provide target node 711 with restricted access to services provided by ATM 701. For example, target node 711 may only be provided access to ATM 701 for a limited period of time or limit a number of transactions conducted within a predetermined time period. Target node 711 be unable to request specific denominations when making a cash withdrawal or may be required to provide additional authentication before being provided access to ATM 701.

Figure 8:
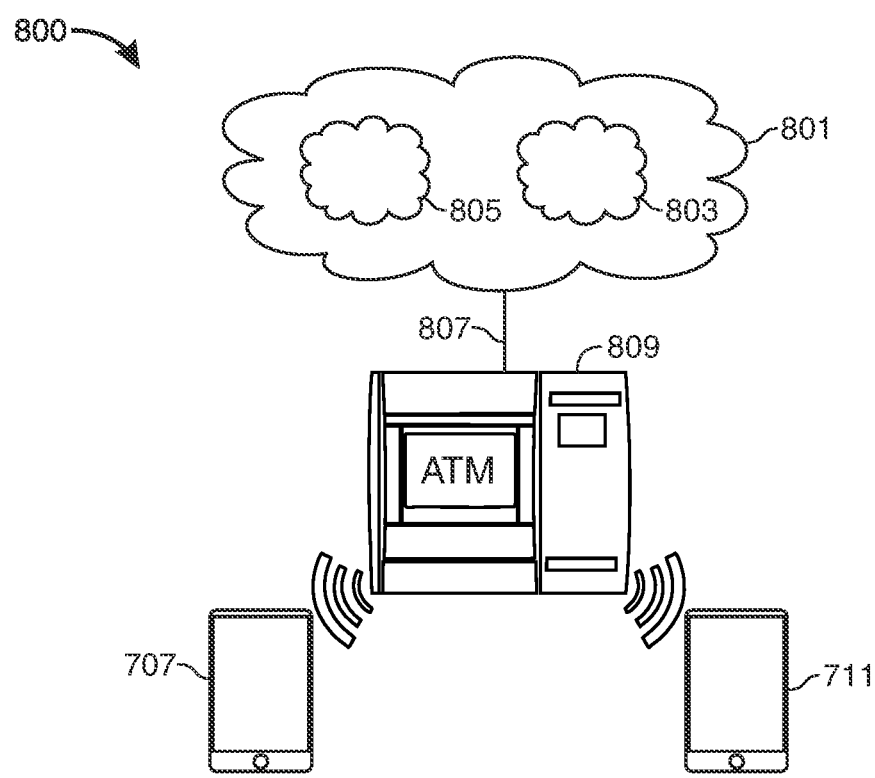
FIG. 8 shows illustrative apparatus in accordance with principles of the disclosure.

While FIG. 7 shows that ATM 701 includes data ports 703 and 705, FIG. 8 shows that the segmentation functionality of such data ports may be implemented in cloud computing environment 801. FIG. 8 shows that target nodes 707 and 711 may access ATM 809. Access of target node 707 may be controlled by software stored in cloud location 805.

Software 805 may recognize target node as belonging to an established customer and provide unrestricted access to services provided by ATM 809. Software stored in cloud location 803 may recognize target node as belonging to an un-established customer and provide restricted access to services provided by ATM 809.

An ATM, such as ATM 809 may itself have vnode properties and move between operating environments. For example, ATM 809 may be a portable device that moves to a new location without holding behavior biases when re-located to the new location.

Thus, apparatus and methods for INTERNET OF THINGS ("IOT") VERSATILE NODES are provided. Persons skilled in the art will appreciate that the present disclosure can be practiced by other than the described embodiments, which are presented for purposes of illustration rather than of limitation. The present disclosure is limited only by the claims that follow.

What is claimed is:

1. A method for operating a versatile node ("vnode") that provides enhanced data security and functionality for the vnode by dynamically and mechanically re-purposing the vnode when the vnode transitions between a secure Internet of Things ("IoT") environment and an unsecure IoT environment, the method comprising:

deploying the vnode in the secure IoT environment;

based on attributes captured within the secure IoT environment, mechanically engaging a first set of micro electro-mechanical moveable pins with a first memory location of the vnode;

storing data captured from the secure IoT environment in the first memory location;

sharing the captured data stored in the first memory location with a first group of nodes operating in the secure IoT environment;

moving the vnode to the unsecure IoT environment;

based on attributes captured within the secure IoT environment, mechanically engaging a second set of micro electro-mechanical moveable pins with a second memory location of the vnode;

storing data captured from the unsecure IoT environment in the second memory location; and sharing the captured data stored in the second memory location with a second group of nodes operating in the unsecure IoT environment.

2. The method of claim 1, further comprising: based on attributes captured from the unsecure IoT environment mechanically disengaging the first set of micro electro-mechanical moveable pins from the first memory location, thereby preventing the first memory location from being accessed by members of the second group of nodes, and purging any prior data stored in the second memory location.

3. The method of claim 1, further comprising:

sharing the captured data stored in the first memory location with the first group of nodes using a first data port; and sharing the captured data stored in the second memory location with the second group of nodes using a second data port.

4. The method of claim 1, further comprising:

based on attributes captured from the secure IoT environment, designating a first target memory location within a memory bank of the vnode as the first memory location for storage of the data captured from the secure IoT environment; and based on attributes captured from the unsecure environment, designating a second target memory location within the memory bank as the second memory location for storage of the data captured from the unsecure IoT environment.

5. The method of claim 1, further comprising:

based on the attributes captured from the secure IoT environment, mechanically engaging the first set of micro electro-mechanical moveable pins with the first memory location and forming an electronic pathway linking the first memory location and a data port; and based on attributes captured from the unsecure IoT environment, mechanically disengaging the first set of micro electro-mechanical moveable pins from the first memory location, and mechanically engaging the second set of micro electro-mechanical moveable pins with the second memory location and forming an electronic pathway linking the second memory location and the data port.

* * * * *